United States Patent
Kishi et al.

[11] Patent Number: 5,535,185
[45] Date of Patent: Jul. 9, 1996

[54] INFORMATION RECORDING/REPRODUCTION APPARATUS USING PROBE

[75] Inventors: Etsuro Kishi, Sagamihara; Hisaaki Kawade, Yokohama; Kiyoshi Takimoto, Isehara; Koji Yano, Zama, all of Japan

[73] Assignee: Canon Kabushiki Kaisha, Tokyo, Japan

[21] Appl. No.: 183,816

[22] Filed: Jan. 21, 1994

[30] Foreign Application Priority Data

Jan. 21, 1993 [JP] Japan .................................. 5-008473

[51] Int. Cl.⁶ ........................... G11B 9/00; G01N 23/00; G21K 7/00; G03G 13/00
[52] U.S. Cl. ........................................ 369/126; 250/306
[58] Field of Search .............................. 369/126; 250/306

[56] References Cited

U.S. PATENT DOCUMENTS

| | | | |
|---|---|---|---|
| 2,221,776 | 11/1940 | Carlson | 95/5 |
| 2,297,691 | 10/1942 | Carlson | 95/5 |
| 2,576,047 | 11/1951 | Schaffen | 101/426 |
| 2,618,552 | 11/1952 | Wise | 95/1.9 |
| 2,626,865 | 1/1953 | Mayo et al. | 95/1.9 |
| 2,638,146 | 5/1953 | Rounseveille et al. | 154/1.76 |
| 2,776,907 | 1/1957 | Carlson | 117/17.5 |
| 2,803,542 | 8/1957 | Ullrich, Jr. | 96/1 |
| 2,874,063 | 2/1959 | Greig | 117/17.5 |
| 2,970,906 | 2/1961 | Bixbyy | 96/1 |
| 3,121,007 | 2/1964 | Middleton et al. | 96/1 |
| 3,151,982 | 10/1964 | Corrsin | 96/1 |
| 3,166,432 | 1/1965 | Gundlach | 117/17.5 |
| 3,186,838 | 6/1965 | Graff, Jr. et al. | 96/1 |
| 5,107,112 | 4/1992 | Yanagisawa et al. | 250/306 |
| 5,220,555 | 6/1993 | Yanagisawa et al. | 369/126 |
| 5,255,259 | 10/1993 | Hatanaka | 369/126 |
| 5,287,342 | 2/1994 | Kishi et al. | 369/126 |
| 5,371,727 | 12/1994 | Shido | 369/126 |
| 5,375,087 | 12/1994 | Moreland | 250/306 |
| 5,414,690 | 5/1995 | Shido | 369/126 |
| 5,418,363 | 5/1995 | Elings | 369/126 |

Primary Examiner—Georgia Y. Epps
Assistant Examiner—Ricky Mack
Attorney, Agent, or Firm—Fitzpatrick, Cella, Harper & Scinto

[57] ABSTRACT

An information recording/reproduction is performed as follows on a recording medium using a probe. A distance between the probe and a recording layer of the recording medium is controlled, and relative movement of the probe and the medium is effected so that the probe scans a surface of the recording layer. Recording bits corresponding to information is recorded or erased on the recording layer under a predetermined recording/erasing condition. The information is reproduced from the recording bits produced on the recording layer upon detection of a physical quantity such as a tunneling current, an electric field radiation current and the like generated between the probe and the recording layer. A characteristic/state such as an electrical characteristic, a surface state and the like of the recording layer is detected. The recording/erasing condition is corrected on the basis of the detected characteristic/state of the recording layer.

21 Claims, 8 Drawing Sheets

INFORMATION RECORDING/REPRODUCTION APPARATUS USING PROBE

BACKGROUND OF THE INVENTION

1. Field of the Invention

The present invention relates to an apparatus for recording/reproducing information using an apparatus (Scanning Probe Microscopy; to be referred to as an SPM hereinafter) for detecting surface information in accordance with a tunneling current or force generated between a probe and a sample.

2. Related Background Art

SPMs are classified in accordance with substances to be detected. Various physical quantities such as a tunneling current, a force (e.g., an atomic force, an electrostatic force, or a magnetic force), light, and an electrostatic capacitance become detection targets. In any case, a common detection technique for detecting a physical quantity with a probe having a sharp tip is used. This detection method has recently rapidly been developed to exhibit a high spatial resolution of 0.1 nm to several tens of nm.

Along with the development of the SPM, various recording/reproduction apparatuses using the principle of SPM have been proposed. It is possible to produce a very small recording bit having a size of 1 nm to several hundreds of nm using a stimulus such as a current, an electric field, or a force generated between an SPM probe and a local area of a recording layer in accordance with a high SPM spatial resolution, thereby reproducing the recorded information. As a result, the recording density can be greatly increased.

Recording methods are classified in accordance with a change in physical shape of a surface and a change in electrical, magnetic, chemical, or optical state. Examples of the change used in the former method are physical deformation using a probe, thermal deformation using a high-energy beam such as a laser or electron beam, electric evaporation using a high electric field, and deposition of fine particles. Examples of the change used in the latter method are an electrical switching phenomenon (Japanese Laid-Open Patent Application Nos. 63-161552 and 63-161553) found in a $\pi$ electron-based organic compound or a chalcogen compound, charge storage (U.S. Pat. No. 4,575,822) in a silicon nitride film, various redox reactions of, e.g., a transition metal oxide, viologen, a styryl compound, rare earth diphthalocyanine, polyaniline, polythiophene, polypyrrole, and a metal-TCNQ charge-transfer complex, and a change between crystalline and noncrystalline phases using a vanadium oxide-based crystal glass.

Figure 1:
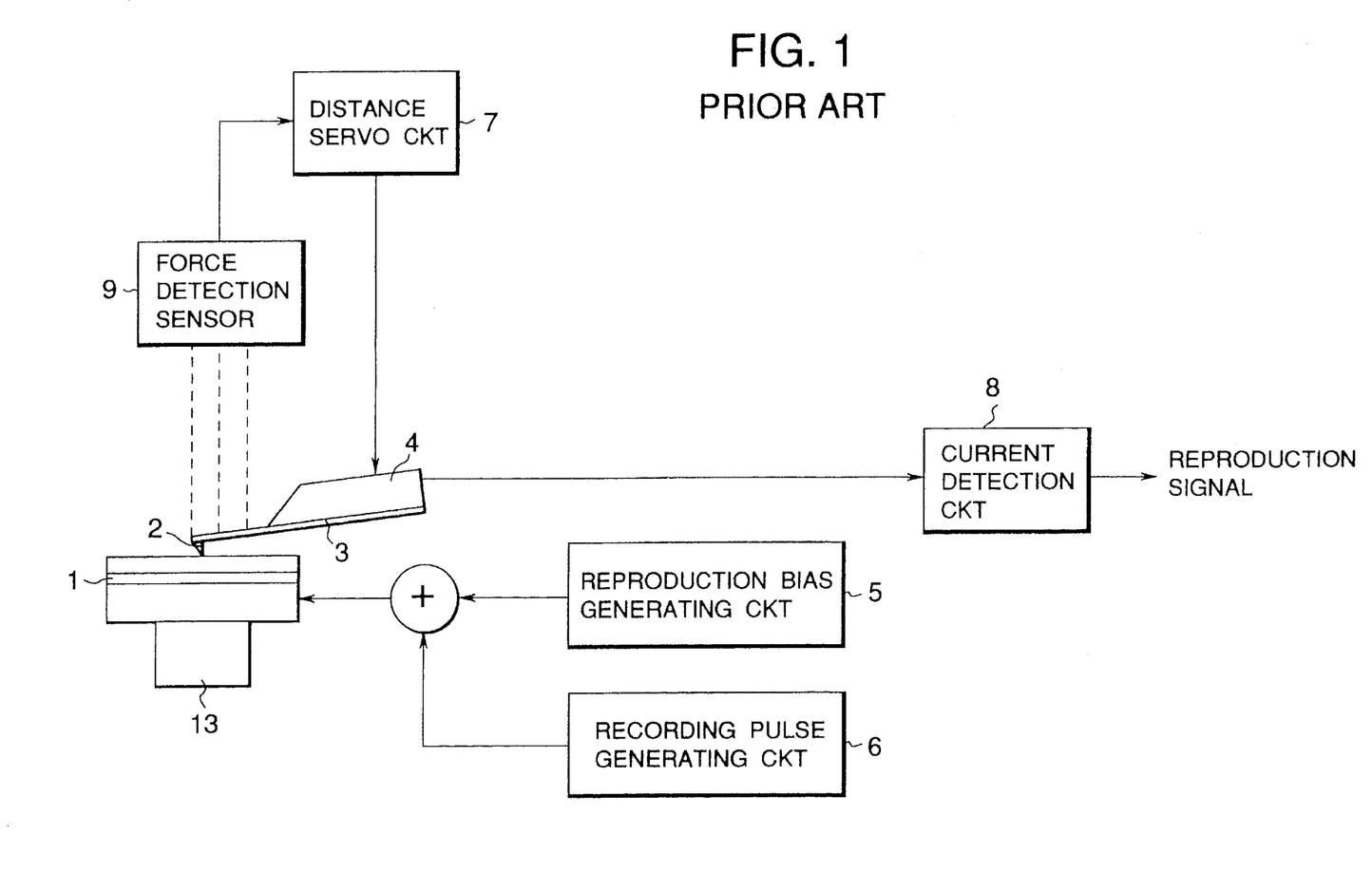
FIG. 1 is a diagram showing a conventional recording/reproduction system.
Figure 2:
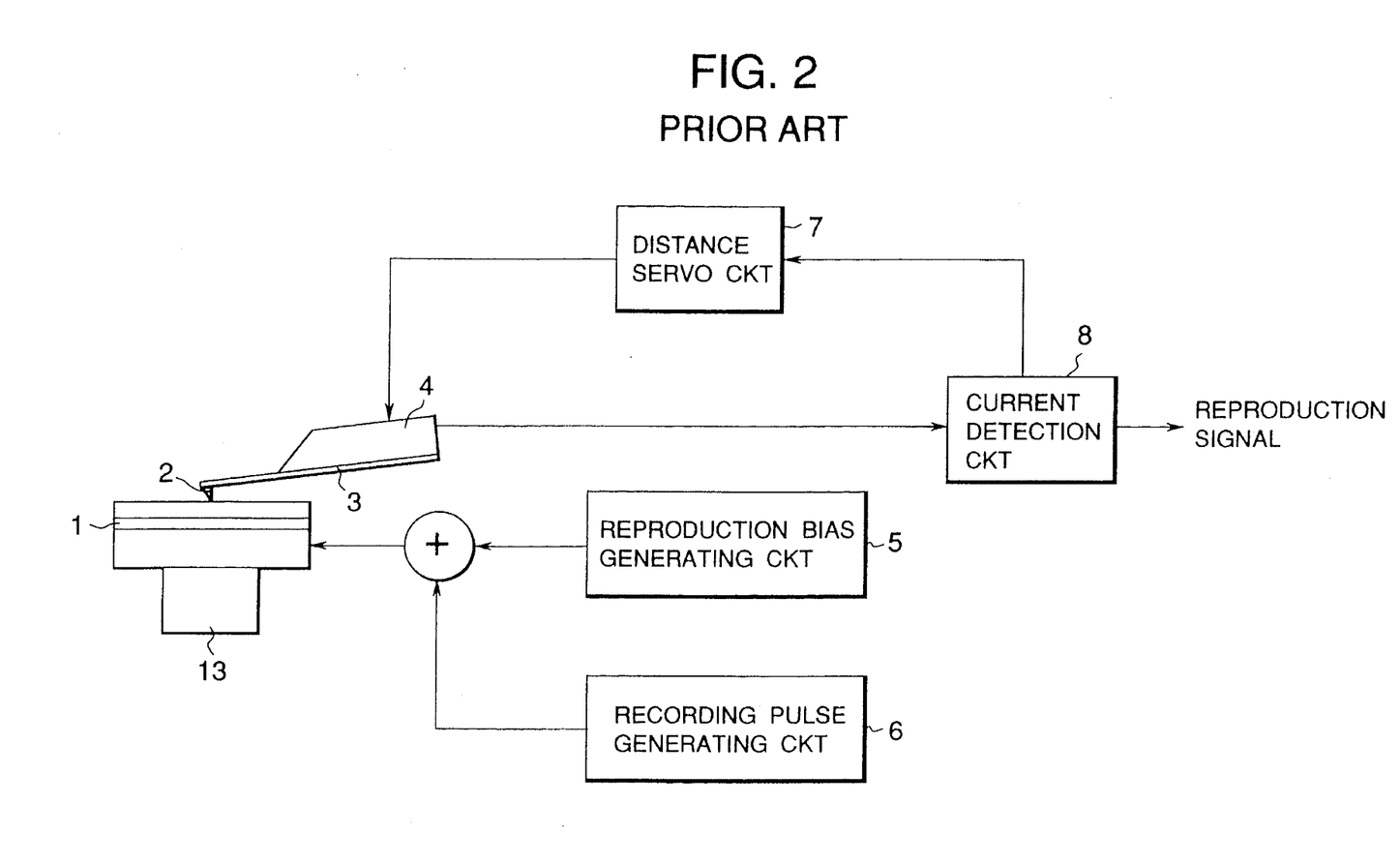
FIG. 2 is a diagram showing another conventional recording/reproduction system.

FIGS. 1 and 2 are diagrams showing conventional recording/reproduction apparatuses, respectively. In the apparatus shown in FIG. 1 or 2, the distance between a recording layer and an SPM probe is controlled using as a servo signal a force (FIG. 1) or tunneling current (FIG. 2) generated between the probe and the recording layer, and a voltage pulse is applied between the recording layer and the probe to record or erase information.

In each conventional apparatus described above, a recording or erasing condition such as a pulse width or height in a recording or erasing voltage pulse generating circuit is fixed. No problem is posed when no defects are present in the recording layer and the thickness and quality of the recording layer are ideally uniform or homogeneous. If variations in thickness or quality of the recording area of the recording layer are present, optimal recording or erasing conditions are shifted to cause variations in produced bit sizes, failures in bit recording or erasure, and in the worst case, a decisive damage to the recording layer and the probe due to dielectric breakdown and thermal destruction.

SUMMARY OF THE INVENTION

The present invention has been made in consideration of all problems which may be posed in the prior arts, and has as its object to provide an information recording/reproduction apparatus capable of correcting an optimal recording or erasing condition in accordance with a change in thickness and quality of a recording layer.

In order to achieve the above object of the present invention, there is provided an information recording/reproduction apparatus for recording/reproducing information on/from a recording medium having a recording layer using a probe, comprising

- means for controlling a distance between the probe and the recording layer,
- means for effecting relative movement of the probe and the medium so that the probe scans a surface of the recording layer,
- means for recording/erasing a recording bit corresponding to the information on/from the recording layer under a predetermined recording/erasing condition,
- means for reproducing the information from the recording bit produced on the recording layer upon detection of a physical quantity generated between the probe and the recording layer,
- means for detecting a characteristic/state of the recording layer, and
- means for correcting the recording/erasing condition on the basis of the detected characteristic/state of the recording layer.

Note that the physical quantity herein is a tunneling current, an electric field radiation current, a contact current, an electrostatic capacitance, an atomic force, a magnetic force, an electrostatic force, or evanescent light, each of which is detected in each SPM mode. The characteristic/state of the recording layer which is to be detected is an electrical characteristic, a magnetic characteristic, an elastic characteristic, an optical characteristic, a surface topography, an internal structure, or a film thickness. Note that each physical quantity to be detected reflects a characteristic/state of the recording layer. A recording/reproduction probe may be used or a new characteristic/state detection unit may be arranged to detect a characteristic/state of the recording layer. A characteristic/state of the recording layer may be detected on a recording area immediately prior to recording or erasure, or near the recording area during movement between recording areas.

The recording/erasing condition subjected to correction is a height, width, or shape of a stimulus pulse, e.g., electricity, light, magnetism, or force as a recording/erasing stimulus, or a position in a direction of height where a pulse is applied. At least one of these factors is corrected. The recording/erasing condition may be corrected for each recording area or for each predetermined interval or duration such as each recording area array.

In the present invention having the above constitution, the characteristic/state of the recording layer which reflects its thickness or quality is detected in a recording area prior to recording or erasing a recording bit or near the recording area. The recording/erasing condition is corrected on the basis of the detected characteristic/state of the recording layer.

DETAILED DESCRIPTION OF THE PREFERRED EMBODIMENTS (First Embodiment)

Figure 3:
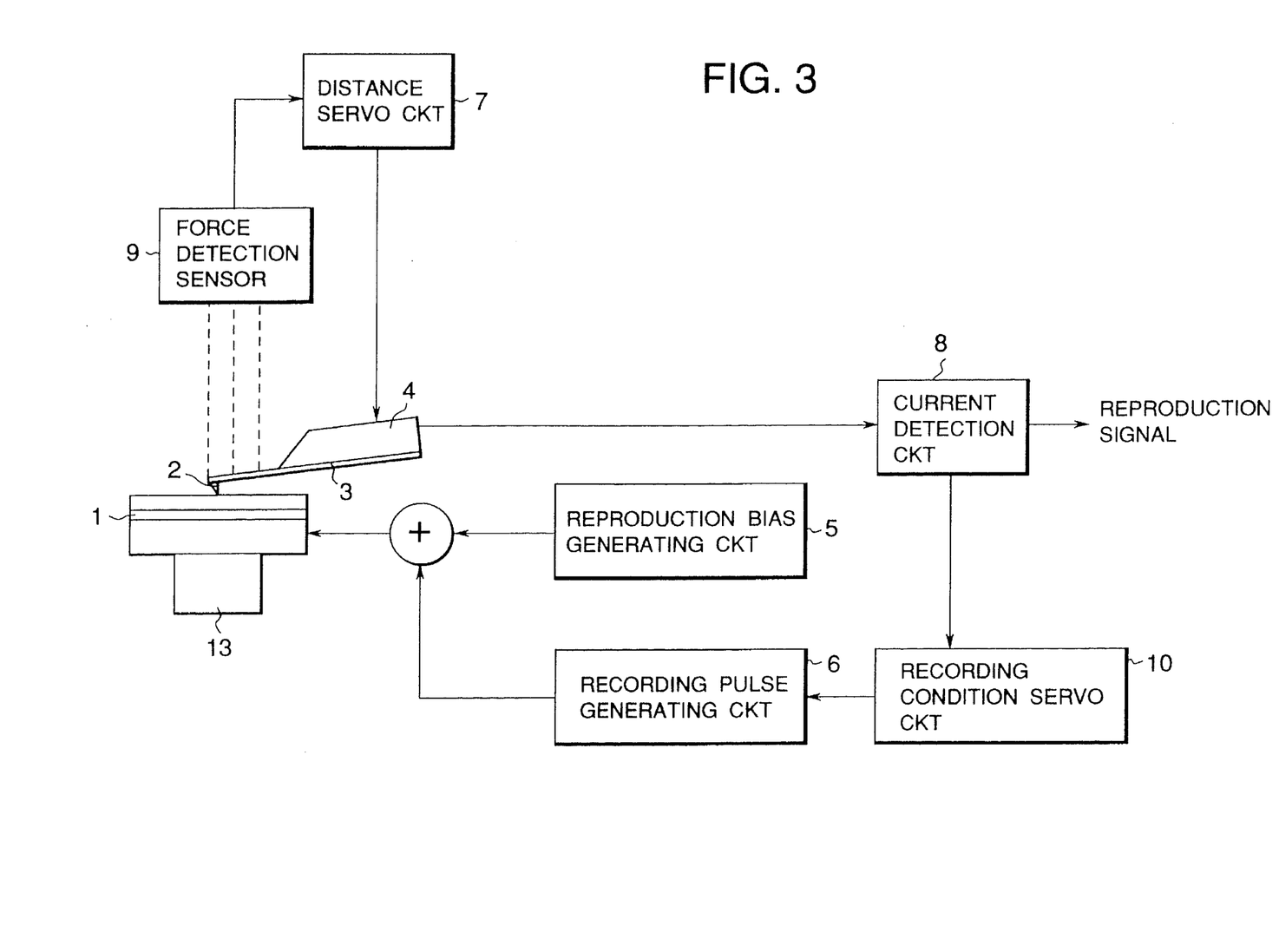
FIG. 3 is a diagram showing the first embodiment of the present invention.

The first embodiment will exemplify an operation of detecting a characteristic/state of a recording layer in accordance with a tunneling current, an electric field radiation current, a contact current, or a modulation signal thereof and feeding the detected characteristic/state back to a recording condition. FIG. 3 is a block diagram showing a system according to the first embodiment of the present invention.

A recording layer 1 consists of a polyimide. Ten monomolecular layers are formed on the electrode surface of a substrate in accordance with a Langumuir-Blodgett technique. A polyimide is a kind of $\pi$ electron-based organic compound described in reference to the prior art, and the conductivity of a polyimide film is known to reversibly change upon application of a voltage. The polyimide film can therefore be used as an erasable recording medium. When a voltage exceeding a threshold voltage is applied to the polyimide film, the film conductivity increases to 1,000 to 10,000 times, which is confirmed in the SPM system shown in FIG. 3.

The threshold voltage is experimentally confirmed to change depending on the number of films of the recording layer. An optimal recording voltage also increases with an increase in the number of films. When a voltage exceeding the optimal recording voltage is applied, the recording bit size is confirmed to increase. If a higher voltage is applied to the recording layer, the recording layer and the probe may be damaged due to dielectric breakdown. When the recording voltage pulse is constant as in the prior art, the recording bit size may become abnormally large in a recording area in which the number of films is reduced in a defective portion of the recording layer. In addition, a damage which cannot be repaired may be formed in the recording layer and the probe.

On the basis of the negative correlation between the number of films and the detection current according to this embodiment, the recording pulse voltage is feedback-controlled using a detection current which reflects the number of films as one of the characteristics/states of the recording layer, thereby achieving the object of the present invention. This will be described in more detail with reference to FIG. 3.

In this embodiment, a detection force is used as a servo signal to control a distance. An elastic member 3 for supporting a conductive probe (to be referred to as a probe hereinafter) 2 is a cantilevered leaf spring. In a practical recording/reproduction system, the elastic member 3 is constituted by a plurality of elastic members integrated and formed on a single substrate in accordance with micromechanical techniques. For the descriptive convenience, only one elastic member is used as a representative elastic member. When the probe 2 is brought to a distance of several tens of nm to several nm to the surface of the recording layer 1 by a distance fine movement mechanism 4, an atomic force starts being generated between the probe 2 and the recording layer 1. An elastic deformation of the cantilevered elastic member 3 which is caused by this atomic force is detected by a force detection sensor 9 of an optical lever scheme or tunneling current detection scheme. The distance fine movement mechanism 4 is feedback-controlled between the recording layer 1 and the probe 2 through a distance servo circuit 7 so that the detection force is always kept constant. As a result, the distance between the surface of the recording layer 1 and the probe 2 can always be kept constant.

According to this method, the detection force acts in an attraction region (i.e., distance between probe and recording layer>0) and a repulsion region (distance between probe and recording layer=0, i.e., contact). The detection force is frequently used in the repulsion region which is excellent in detection sensitivity. Alternatively, the elastic constant of the elastic member 3 may be set much smaller than that on the surface of the recording layer 1. In this case, the contact state between the probe and the recording layer can be kept almost constant without feedback control by means of the distance fine movement mechanism 4.

In a state (including the contact state) wherein the distance between the probe and the surface of the recording layer is kept constant, a bias voltage lower than a recording threshold voltage is applied between the recording layer 1 and the probe 2 by a reproduction bias generating circuit 5, and the generated current is detected by a current detection circuit 8 comprising a current-voltage converter and a logarithmic converter. The detected current is supplied to a recording condition servo circuit 10 newly arranged in the present invention.

Figure 6:
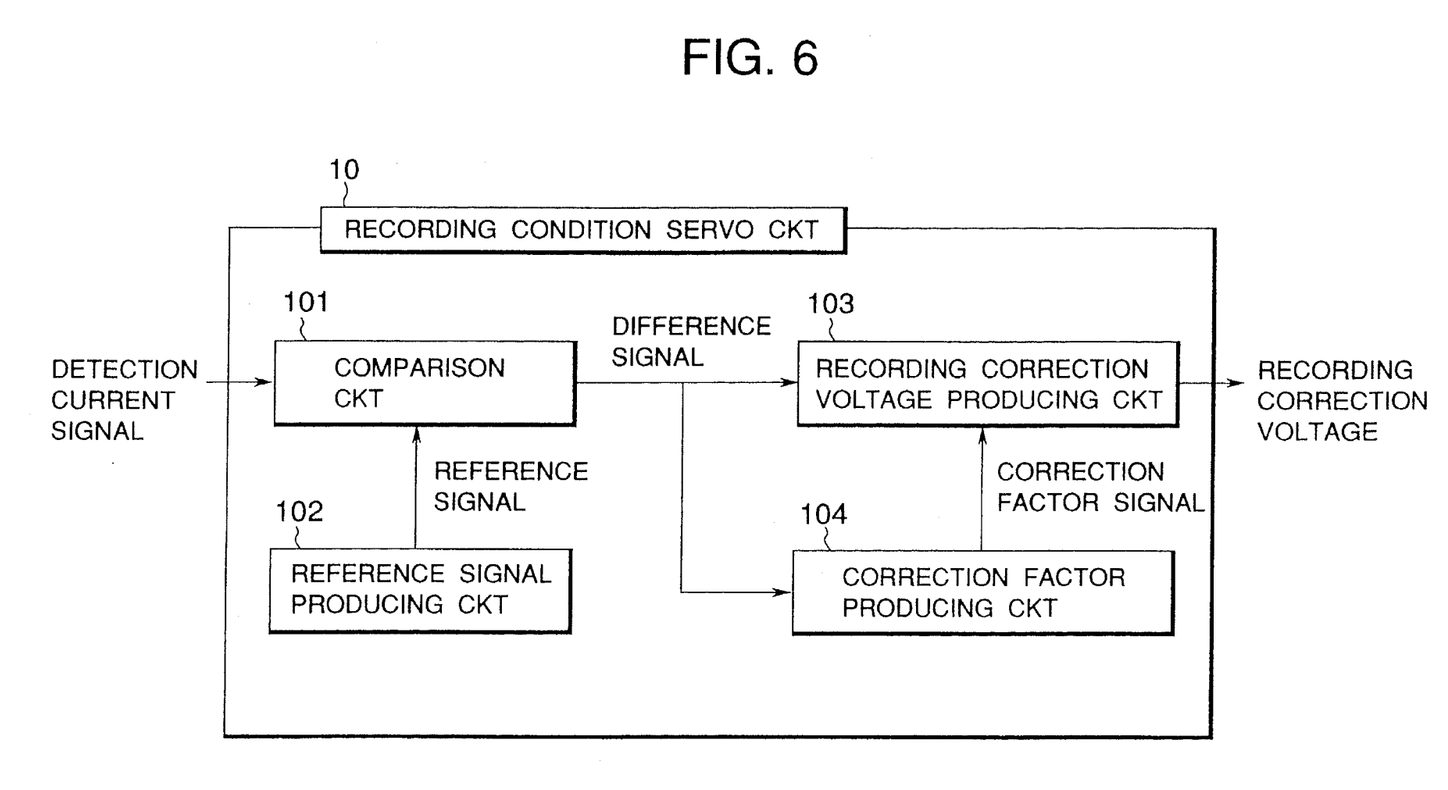
FIG. 6 is a block diagram showing an arrangement of a recording condition servo circuit 10 shown in FIG. 3.

The details of the recording condition servo circuit 10 will be described with reference to FIG. 6.

In the recording condition servo circuit 10, a comparison circuit 101 compares the detection current signal with a reference signal from a reference signal producing circuit 102 for generating a reference current value signal corresponding to a reference number of films of the recording layer and produces a difference signal. A recording correction voltage producing circuit 103 multiplies this difference signal with a correction factor signal from a correction factor producing circuit 104 and outputs a recording correction voltage. The correction factor producing circuit 104 outputs an experimentally obtained correction factor in advance. This correction factor may be obtained by approximation using a constant or may be obtained for further precision by a calculation using an exponential function in accordance with the magnitude of the difference signal.

Figure 7:
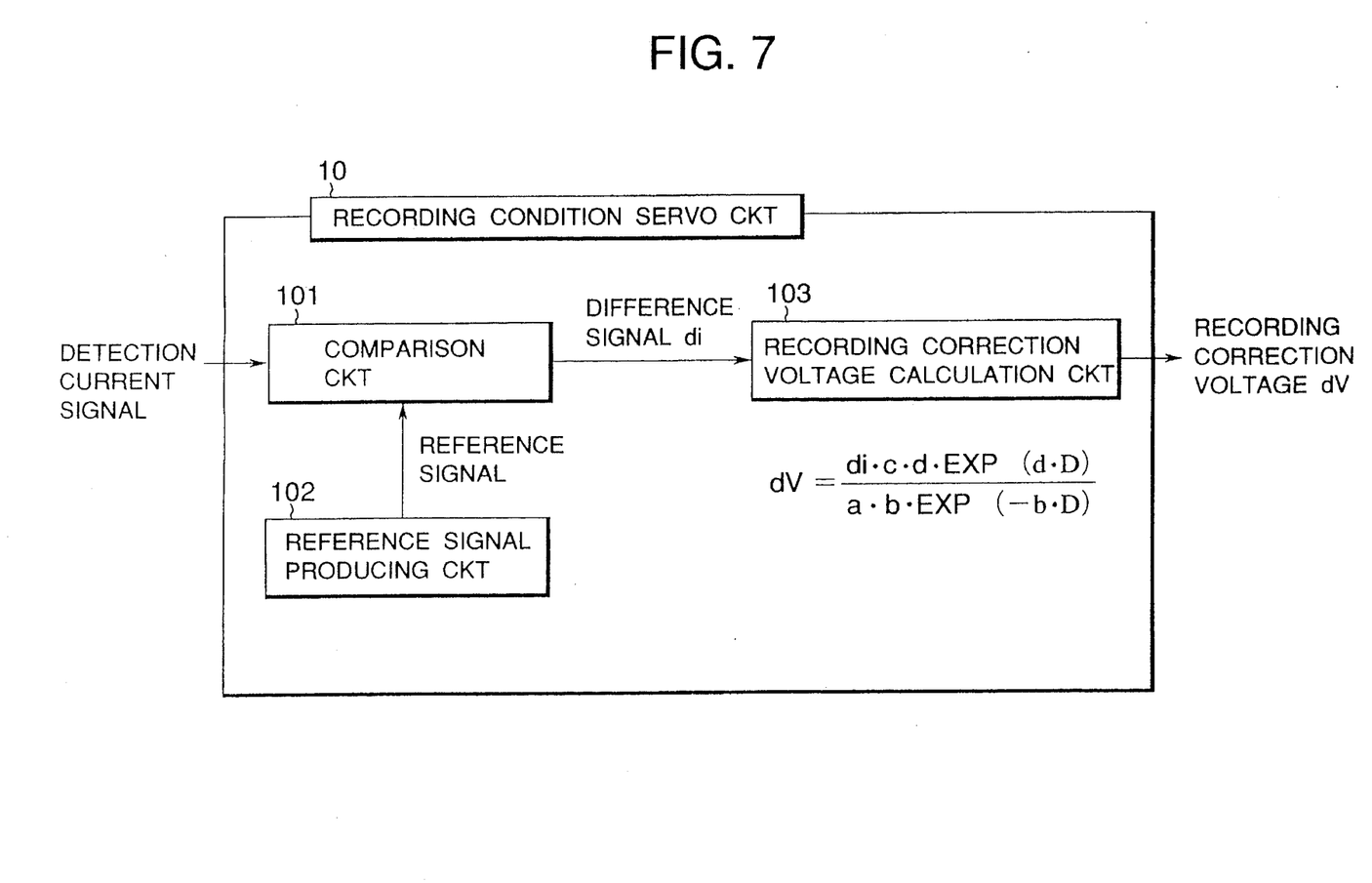
FIG. 7 is a block diagram showing another arrangement of the recording condition servo circuit 10 shown in FIG. 3.

Another arrangement of the recording condition servo circuit 10 is shown in FIG. 7.

Referring to FIG. 7, in the recording condition servo circuit 10, a comparison circuit 101 compares a detection current value with a reference signal from a reference signal producing circuit 102 for generating a reference current value signal corresponding to a reference number of films of the recording layer and produces a difference signal. A recording correction voltage calculation circuit 103 performs a predetermined calculation of this difference signal di and outputs a recording correction voltage dV.

The calculation is performed on the basis of a relation between the thickness of the recording layer and the detection current and a relation between the thickness of the recording layer and the optimal recording voltage, which relations are experimentally obtained in advance. For example, assume that the relation between a recording layer thickness D and a detection current i is $i = a \cdot EXP(-b \cdot D)$ (a and b are positive constants), and the relation between the recording layer thickness and the optimal recording voltage is $V = c \cdot EXP(d \cdot D)$ (c and d are positive constants). In this case, the difference signal di is calculated such that $dV = di \cdot c \cdot d \cdot EXP(d \cdot D)/(a \cdot b \cdot EXP(-a \cdot D))$, thereby outputting the recording correction voltage dV.

As described above, the recording correction voltage dV output from the recording condition servo circuit 10 is added to the reference pulse voltage in a recording pulse generating circuit 6.

When the corrected recording voltage pulse is applied between the probe and the recording layer, correction of the optimal recording voltage pulse can be performed in real time in correspondence with a change in the number of films even if the number of films of the recording area is different from the reference number of films. A uniform recording bit can be produced or erased always with good reproducibility.

A horizontal direction displacing mechanism 13 moves the probe to sequentially produce recording bits. Correction of the recording condition which is based on a characteristic/state of the recording layer may be constantly performed during a series of recording operations except for application of the recording voltage pulse, and the characteristic/state of the recording layer may be detected on a recording area immediately prior to recording by means of a timing signal or may be detected near the recording area during movement between recording areas. The recording/erasing condition may be corrected for each recording area or for each predetermined interval or duration such as each recording area array. The recording voltage pulse is controlled to have a predetermined value during its application by setting the pulse width outside the band of the recording condition servo circuit 10. If the pulse width is large to fall within the band of the servo circuit, the recording condition must be kept constant by a sample/hold circuit.

In reproduction of recording bits, the probe is moved by the horizontal signal displacing mechanism 13 to sequentially detect reproduction signals from the respective recording areas. Each reproduction signal is output from a detection current circuit 8 to obtain a signal change corresponding to a 1,000- to 10,000-fold current increase on an ON bit.

(Second Embodiment)

Figure 4:
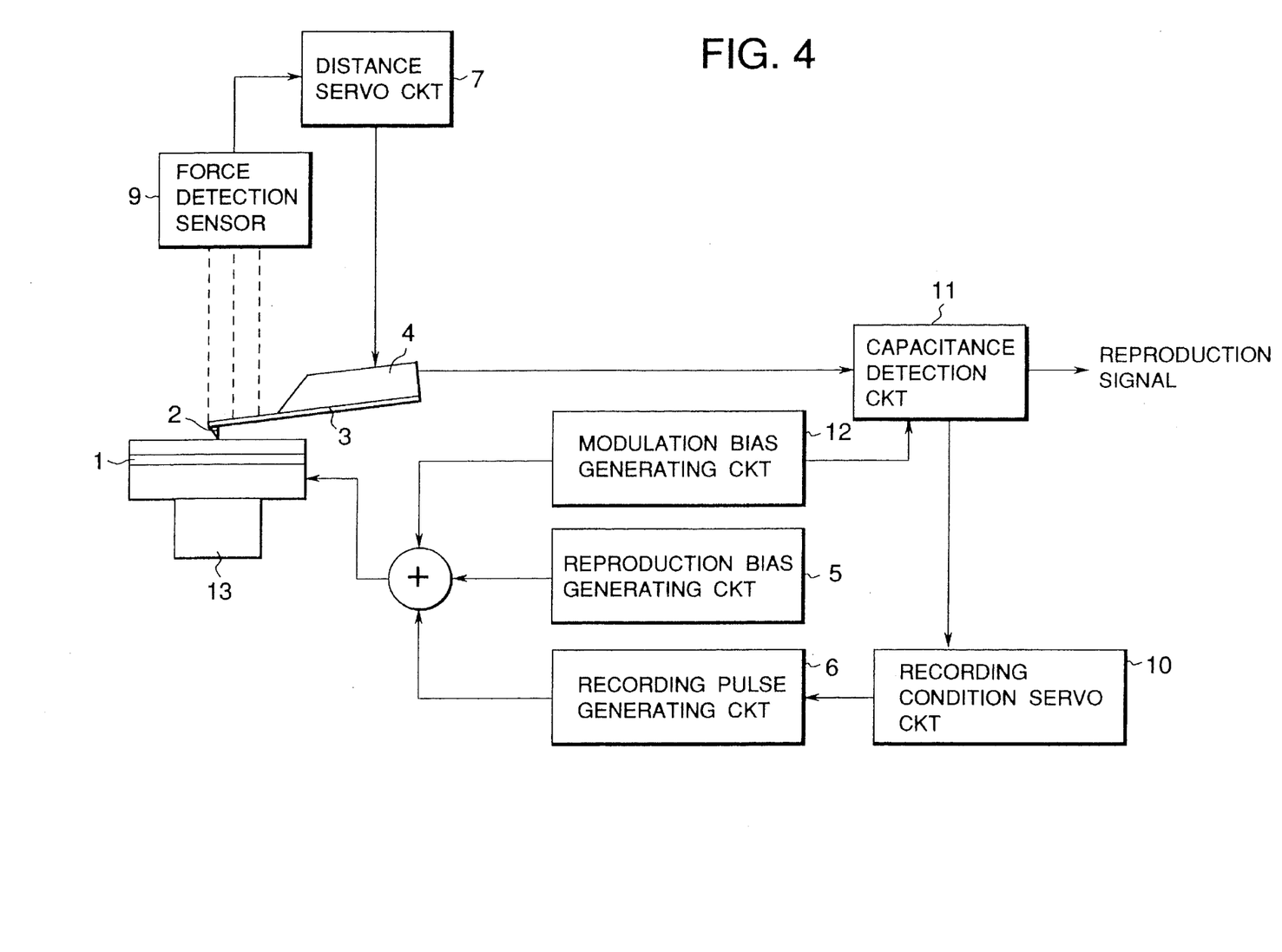
FIG. 4 is a diagram showing the second embodiment of the present invention.

The second embodiment will exemplify an operation of detecting a characteristic/state of a recording layer from an electrical capacitance and feedback-controlling the detected capacitance to a recording condition. FIG. 4 is a block diagram showing a system according to the second embodiment of the present invention.

A recording layer 1 consists of silicon oxide and nitride films formed on a silicon substrate. After a silicon oxide film having a thickness of 1 to 2 nm is formed on a boron-doped p-type silicon [100] substrate by an HCl chemical treatment, a silicon nitride film having a thickness of 30 to 50 nm is formed on the silicon oxide film by LPCVD (low-pressure CVD). This nitride film has many trap levels. When a recording voltage pulse is applied between the probe and the recording layer in the SPM system shown in FIG. 4, electrons are confirmed to be trapped in the nitride film; when a voltage pulse of the opposite polarity is applied, these electrons are confirmed to be released. The above recording layer has received a great deal of attention as an erasable charge-storage recording medium.

Reproduction is performed by detecting the capacitance of a recording area. A threshold voltage for generating a depletion layer at the boundary with the p-type silicon substrate is shifted by an overvoltage generated by the charge storage. The capacitance of the recording layer which changes in correspondence with the state of the depletion layer is detected at an appropriate reproduction bias voltage to detect the presence/absence of stored charges.

The size of the charge storage area varies depending on the thicknesses of the nitride and oxide layers and variations in doping level at the silicon boundary. The optimal recording voltage for obtaining a desired bit size varies accordingly. When voltages exceeding an optimal recording voltage are applied, the size of the recording bit tends to abruptly increase over a certain point. For this reason, when the recording voltage pulse is kept constant as in the prior art, the variations in characteristic/state of the recording layer may be typically reflected in the recording bit size.

According to this embodiment, the capacitance which changes in accordance with the variations in characteristic/state of the recording,layer is detected at a specific bias, and the pulse height or width of the recording pulse voltage is feedback-controlled by the detected capacitance or its voltage differential signal, thereby achieving the object of the present invention. This will be described in more detail with reference to FIG. 4.

This embodiment exemplifies a method of using a detection force as a servo signal to control a distance. Distance control is the same as in the first embodiment, and a detailed description thereof will be omitted. In a state wherein a bias voltage equal to or lower than the recording threshold voltage from a reproduction bias generating circuit 5 is superposed on a modulation bias from a modulation bias generating circuit 12 between the recording layer and a conductive probe 2, the capacitance of the recording layer is detected by a capacitance detection circuit 11 constituted by an LC resonator and a lock-in detector. The detected capacitance (or its voltage differential signal) is supplied to a recording condition servo circuit 10 newly arranged in the present invention.

Figure 8:
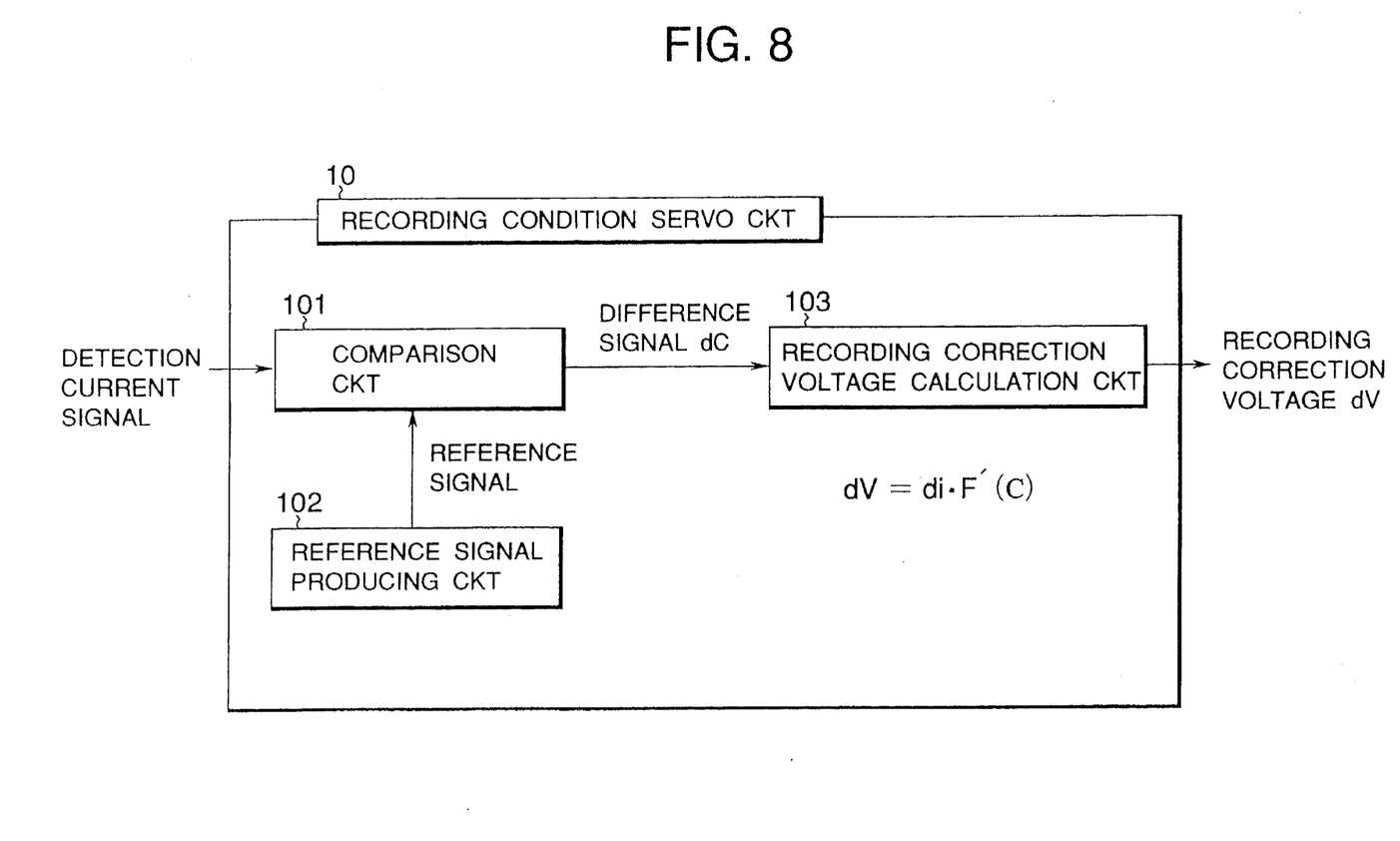
FIG. 8 is a block diagram showing an arrangement of a recording condition servo circuit 10 shown in FIG. 4.

The details of the recording condition servo circuit 10 will be described with reference to FIG. 8.

In the recording condition servo circuit 10, a comparison circuit 101 compares the detection capacitance value with a reference signal from a reference signal producing circuit 102 for generating a reference capacitance value signal corresponding to a reference number of films of the recording layer and produces a difference signal. A recording correction voltage calculation circuit 103 performs a predetermined calculation of this difference signal dC and outputs a recording correction voltage dV.

This calculation is performed on the basis of a relation between the detection capacitance and the optimal recording voltage, which relation is experimentally obtained in advance. If the relation between the detection capacitance and the optimal recording voltage, which is experimentally obtained in advance, is $V = F(C)$, the difference signal dC is calculated such that $dV = di \cdot F'(C)$, thereby outputting the recording correction voltage dV.

This recording correction voltage is added to the reference pulse voltage by the recording pulse generating circuit 6. In charge storage recording of this embodiment, the pulse width may be corrected in place of the pulse height as the recording condition as a control target.

When the recording voltage pulse corrected as described above is applied between the probe and the recording layer, correction of the optimal recording voltage pulse can be performed in real time in correspondence with a change in the number of films even if a characteristic/state of the recording layer varies. A uniform recording bit can be produced or erased always with good reproducibility.

(Third Embodiment)

Figure 5:
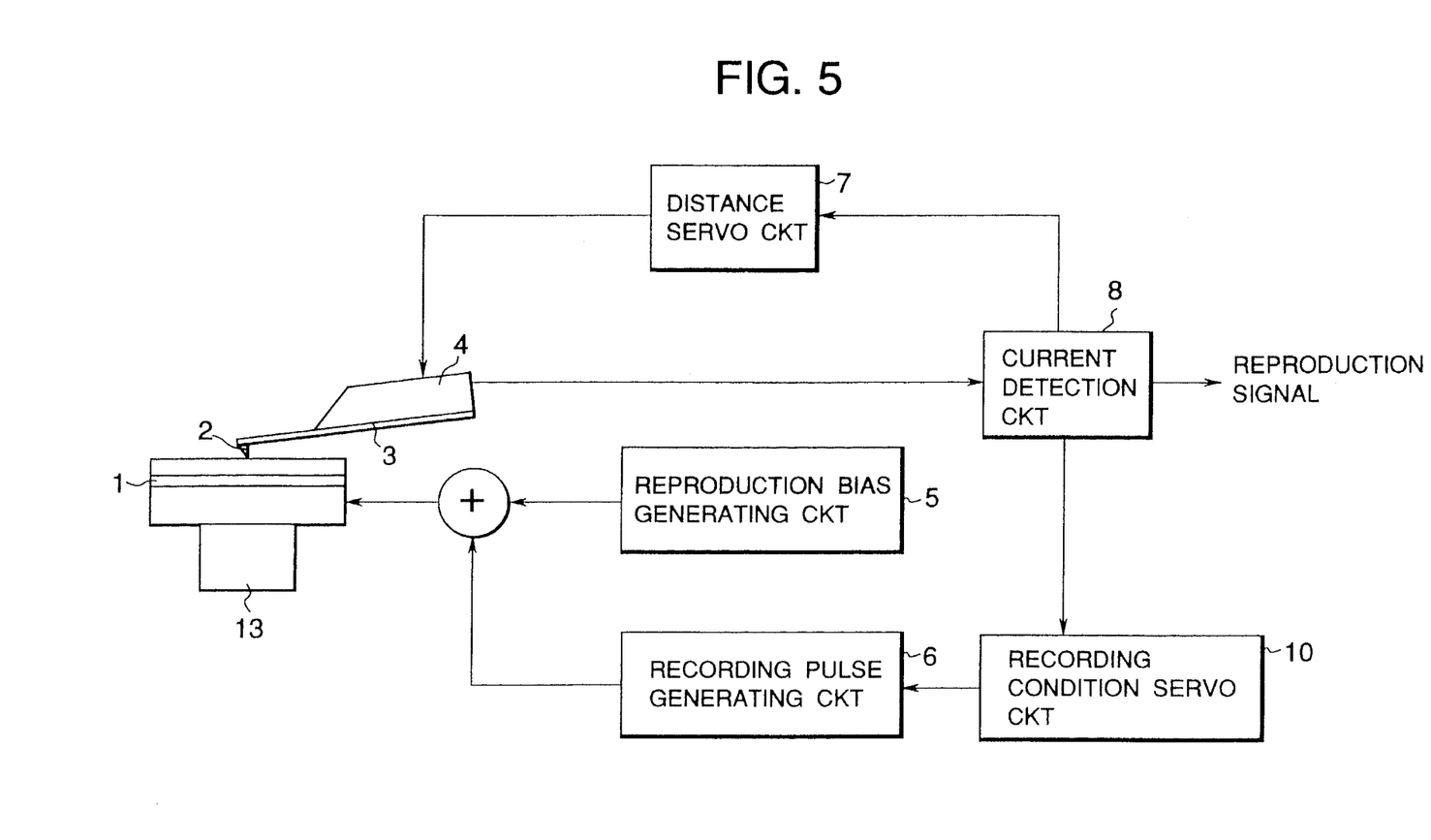
FIG. 5 is a diagram showing the third embodiment of the present invention.

FIG. 5 is a block diagram showing a system according to the third embodiment of the present invention. Distance control is performed by force detection in the first and second embodiments. As shown in FIG. 5, a detection current may be used as a servo signal to control a distance. In this case, a signal representing the characteristic/state of a recording layer and output from a current detection circuit 8 to a recording condition servo circuit 10 is a so-called topographical signal corresponding to a difference output between the detection current and the preset current for constant current control, or is a current signal for constant height control.

It is possible to add a modulation signal to a reproduction bias or a distance control signal to lock-in-detect a response current component, thereby setting, as a signal representing the characteristic/state of the recording layer, an electron state density independent of the film shape and thickness, or a film quality which reflects an electron state such as a barrier height.

The above embodiments have exemplified correction associated with recording conditions. Correction of erasing conditions in an erasable recording system can be performed in the same manner as in correction of the recording conditions.

What is claimed is:

1. An apparatus for at least one of recording information on and erasing information from a recording medium having a recording layer using a probe, comprising:

means for effecting relative movement of the probe and the medium so that the probe scans a surface of the recording layer;

means for at least one of recording a recording bit corresponding to the information on and erasing a recording bit corresponding to information from the recording layer;

means for detecting a physical quantity generated between the probe and the recording layer; and means for correcting the at least one of the recording and erasing condition of said recording and erasing means on the basis of the detected physical quantity.

2. An apparatus according to claim 1, wherein said correcting means performs correction during at least one of a recording operation and an erasing operation.

3. An apparatus according to claim 1, wherein the physical quantity is a tunneling current.

4. An apparatus according to claim 1, wherein the physical quantity is an electric field radiation current.

5. An apparatus according to claim 1, wherein the physical quantity is a contact current.

6. An apparatus according to claim 1, wherein the physical quantity is an electrostatic capacitance.

7. An apparatus according to claim 1, wherein the physical quantity is an interatomic force.

8. An apparatus according to claim 1, wherein the physical quantity is a magnetic force.

9. An apparatus according to claim 1, wherein the physical quantity is an electrostatic force.

10. An apparatus according to claim 1, wherein the physical quantity is evanescent light.

11. An apparatus according to claim 1, wherein the detected characteristic of the recording layer is an electrical characteristic.

12. An apparatus according to claim 1, wherein the detected characteristic of the recording layer is a magnetic characteristic.

13. An apparatus according to claim 1, wherein the detected characteristic of the recording layer is an elastic characteristic.

14. An apparatus according to claim 1, wherein the detected characteristic of the recording layer is an optical characteristic.

15. An apparatus according to claim 1, wherein the detected state of the recording layer is a surface topography.

16. An apparatus according to claim 1, wherein the detected state of the recording layer is a film thickness.

17. An apparatus according to claim 1, wherein said recording and erasing means applies a pulse voltage between the probe and the recording layer to change an electrical characteristic of the recording layer, thereby performing at least one of recording and erasing a recording bit.

18. An apparatus according to claim 17, wherein said correcting means corrects a magnitude of the voltage.

19. An apparatus according to claim 17, wherein said correcting means corrects a pulse width of said pulse voltage.

20. An apparatus according to claim 17, wherein said correcting means corrects a pulse shape of said pulse voltage.

21. An apparatus according to claim 17, wherein said correcting means corrects a distance between said probe and said recording layer upon application of said pulse voltage.

* * * * *